(12) United States Patent
Karimli et al.

(10) Patent No.: US 10,694,533 B2
(45) Date of Patent: Jun. 23, 2020

(54) NETWORK SCHEDULING IN UNLICENSED SPECTRUMS

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 157 days.

(21) Appl. No.: 15/383,780

(22) Filed: Dec. 19, 2016

(65) Prior Publication Data

US 2018/0176932 A1    Jun. 21, 2018

(51) Int. Cl.
*H04W 72/12* (2009.01)
*H04W 16/14* (2009.01)

(52) U.S. Cl.
CPC ....... *H04W 72/1226* (2013.01); *H04W 16/14* (2013.01)

(58) Field of Classification Search
None
See application file for complete search history.

(56) References Cited

U.S. PATENT DOCUMENTS

| | | | | |
|---|---|---|---|---|
| 2012/0314703 A1* | 12/2012 | Testa | ............... | H04L 12/2852 370/389 |
| 2013/0242919 A1* | 9/2013 | Koo | ............... | H04W 72/1215 370/329 |
| 2015/0126207 A1* | 5/2015 | Li | ............... | H04W 16/14 455/452.1 |
| 2017/0099678 A1* | 4/2017 | Dinan | ............... | H04W 74/0808 |
| 2018/0145736 A1* | 5/2018 | Li | ............... | H04B 7/0626 |
| 2018/0192442 A1* | 7/2018 | Li | ............... | H04L 5/0048 |
| 2019/0075596 A1* | 3/2019 | Ye | ............... | H04W 74/0816 |

\* cited by examiner

*Primary Examiner* — Adnan Baig
(74) *Attorney, Agent, or Firm* — Lee & Hayes, P.C.

(57) ABSTRACT

Network scheduling in unlicensed spectrums is described. A scheduler can assess, at a first time, first conditions of an unlicensed spectrum, such as Long-Term Evolution unlicensed spectrum. Based at least partly on the first conditions, the scheduler can determine a schedule for transmitting data via the unlicensed spectrum. The scheduler can, for a first period of time, facilitate transmission of data between mobile devices that are communicatively coupled to the communication tower based at least partly on the schedule. At a second time after the first time, the scheduler can assess second conditions of the unlicensed spectrum and update the schedule based at least partly on the second conditions to generate an updated schedule. For a second period of time, the scheduler can facilitate transmission of data between the mobile devices based at least in part on the updated schedule.

20 Claims, 5 Drawing Sheets

NETWORK SCHEDULING IN UNLICENSED SPECTRUMS

BACKGROUND

Long-Term Evolution (LTE) is a 4G wireless communications standard developed by the 3$^{rd}$ Generation Partnership Project (3GPP) that is designed to provide increased speeds for mobile devices such as smartphones, tablets, netbooks, notebooks, wireless hotspots, etc. 4G LTE technologies are designed to provide IP-based voice, data, and multimedia streaming at high speeds.

In addition to communicating via LTE technologies, mobile devices often communicate with other mobile devices over wireless network(s). There are two spectrum bands for wireless use: a 2.4 gigahertz (GHz) spectrum band and a 5 GHz spectrum band. Most wireless devices, other than laptops, phones, and tablets, use the 2.4 GHz spectrum band. Accordingly, the 2.4 GHz spectrum band is a very crowded spectrum band. The 5 GHz spectrum band is less congested, and as such, the 5 GHz spectrum band enables networks to work at higher speeds and at greater ranges. The 5 GHz spectrum band is used by devices such as laptops, phones, and tablets. The 5 GHz spectrum band is unlicensed, meaning that any individual or organization can build a device that sends and receives signals in the 5 GHz spectrum band without obtaining permission.

LTE in unlicensed spectrum (LTE-U) uses 4G LTE technologies in unlicensed spectrum, such as the 5 GHz spectrum band described above. LTE-U enables increased coverage in cellular networks by increasing data speeds using the unlicensed 5 GHz spectrum band. That is, LTE-U enables telecommunication service providers (i.e., carriers providing cellular services) to share space with wireless equipment currently using the 5 GHz spectrum band instead of, or in addition to, the radio spectrums to which they have exclusive licenses (e.g., 4G LTE). License Assisted Access (LAA) is an LTE feature that leverages the 5 GHz spectrum band in combination with licensed spectrum to provide a performance boost for mobile device users.

LTE, LTE-U, and LAA each use different scheduling methods to ensure that multiple devices can use the 5 GHz spectrum band harmoniously (i.e., without one device appropriating the bandwidth and preventing other devices from using the 5 GHz spectrum band). For instance, LTE has various methods to mitigate interference, including Transmission Mode 9, Felcic, load-base scheduler, etc. LAA uses a method called Listen Before Talk (LBT), which is a same method that is used for wireless technologies. LTE-U uses eCSAT, which is a method used to transmit data based on previous calls.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques described herein are directed to network scheduling in unlicensed spectrums. As described above, an unlicensed spectrum enables any individual or organization to build a device that sends and receives signals in the spectrum without obtaining permission. An example of an unlicensed spectrum is the 5 gigahertz (GHz) spectrum band used by wireless devices such as laptops, phones, and tablets. As more devices utilize unlicensed spectrums, active management of data exchanged via the unlicensed spectrums is necessary to ensure that users of the devices maximize the benefits of communicating via the unlicensed spectrums, such as having access to higher-speed networks that are able to operate at greater ranges than existing networks. Techniques described herein are directed to a scheduling mechanism for assessing conditions of an unlicensed spectrum at configurable intervals of time and determining schedules for managing data transmission based on an estimation of the conditions for a corresponding interval of time.

In at least one example, a scheduler associated with a communication tower that is part of a communication network, can assess, at a first time, first conditions of an unlicensed spectrum. The unlicensed spectrum is described throughout as a Long-Term Evolution unlicensed (LTE-U) spectrum, however the techniques described herein can be applicable for additional or alternative unlicensed spectrums. Based at least partly on the first conditions, the scheduler can determine a schedule for transmitting data via the unlicensed spectrum for a first period of time between the first time and a second time after the first time. The scheduler can facilitate transmission of data between mobile devices that are communicatively coupled to the communication tower based at least partly on the schedule for the first period of time. At the second time, the scheduler can assess second conditions of the unlicensed spectrum and update the schedule based at least partly on the second conditions to generate an updated schedule. For a second period of time between the second time and a third time after the second time, the scheduler can facilitate transmission of data between the mobile devices based at least in part on the updated schedule.

That is, the scheduler can estimate conditions of an unlicensed spectrum for a period of time and can generate, based on that estimate, a schedule that can be used to facilitate the transmission of data between mobile devices that are capable of communicating via the unlicensed spectrum. The scheduler can then utilize the schedule to facilitate transmission of data via the unlicensed spectrum for the period of time (i.e., until the next condition assessment). In at least one example, techniques described herein can enable carrier aggregation for LTE, LTE-U, and/or LAA.

Various examples of the present disclosure are described below in reference to the figures.

Figure 1:
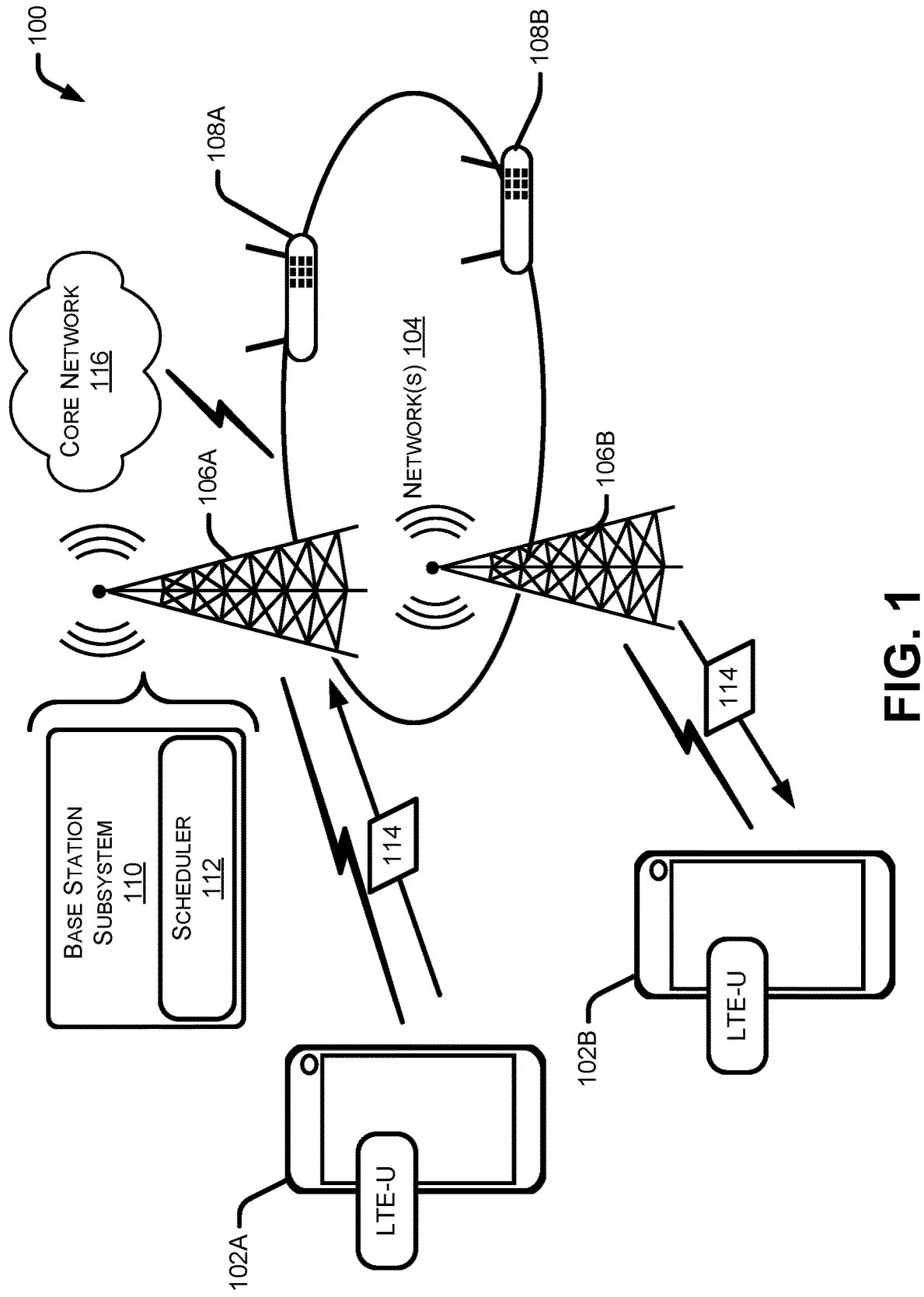
FIG. 1 illustrates an environment for facilitating network scheduling in unlicensed spectrums.

FIG. 1 illustrates an environment 100 for facilitating network scheduling in unlicensed spectrums. In FIG. 1, one or more devices can be communicatively coupled to one or more networks 104. Device 102A and device 102B are two non-limiting examples of devices that can be communicatively coupled to the one or more networks 104. While two devices are shown, any number of devices can be communicatively coupled to the one or more networks 104. Each of the devices (e.g., device 102A, device 102B, etc.) can be configured with technology to enable the devices to communicate via an unlicensed spectrum, such as LTE-U which utilizes an unlicensed 5 GHz spectrum band. Additional details associated with the one or more devices are described below with reference to FIG. 2.

In some examples, device 102A and/or device 102B can connect to the one or more networks 104 via base station 106A or base station 106B, respectively. The base stations (e.g., base station 106A, base station 106B, etc.) can enable access to the one or more networks 104, which can be used for the transmission of voice, data, etc. between the one or more devices (e.g., device 102A, device 102B, etc.) via the one or more networks 104. The one or more networks 104 can include a cellular network, the Internet, and/or one or more other networks (e.g., a Wi-Fi network, another access network, etc.).

In at least one example, a network of the one or more networks 104 may be configured to send and receive data communication via an unlicensed spectrum, such as LTE-U. As described above, LTE-U enables increased coverage in cellular networks by increasing data speeds using an unlicensed 5 GHz spectrum band. That is, LTE-U enables telecommunications service providers to share space with wireless equipment currently using the 5 GHz spectrum band instead of, or in addition to, the radio spectrums to which they have exclusive licenses (e.g., 4G LTE). Router 108A and router 108B are non-limiting examples of other wireless equipment that can share the 5 GHz spectrum band with the equipment associated with the telecommunications service providers. Additional and/or alternative wireless equipment can be communicatively coupled to the one or more networks 104. Each piece of equipment (e.g., base station 106A, base station 106B, router 108A, router 108B, etc.) can correspond to a node of a network of the one or more network(s) 104.

Each base station (e.g., base station 106A, base station 106B, etc.) can be associated with a base station subsystem 110, which can be responsible for handling traffic and signaling between devices via the one or more networks 104. While base station 106A is the only base station shown with a base station subsystem 110, each of the base stations can be associated with a base station subsystem. In at least one example, the base station subsystem 110 can include a scheduler 112 for assessing conditions of an unlicensed spectrum for a period of time and generating a schedule based on the conditions to facilitate the transmission of data between devices (e.g., device 102A, device 102B, etc.) that are capable of communicating via the unlicensed spectrum. As described herein, a schedule can be specific to a particular base station and a particular time interval. That is, a schedule can be effective for a particular time interval and then a new schedule can be determined for a subsequent time interval. Additional details associated with the base station subsystem 110 and the scheduler 112 are described below with reference to FIG. 3. The base station subsystem 110 can leverage the schedule to facilitate data exchange between two or more devices communicatively coupled to the one or more networks 104. That is, the base station subsystem 110 can determine when a device (e.g., device 102A) can send data 114 uplink, that is, from the device (e.g., device 102A) to the base station 106A associated with the base station subsystem 110 and when a base station 106A can send data 114 downlink, that is, from the base station 106A to the device (e.g., device 102B) or another base station for transmission to another device (e.g., device 102B). Additionally, in at least one example, the base station subsystem 110 can enable carrier aggregation for LTE, LTE-U, and/or LAA.

In at least one example, the base station(s) (e.g., base station 106A, base station 106B, etc.) can be communicatively coupled to a core network 116. The core network 116 can be a central part of a telecommunications network that provides telecommunications services to end users associated with the one or more devices (e.g., device 102A, device 102B, etc.). In some examples, core network 116 can route data between base stations (e.g., base station 106A, base station 106B, etc.). For instance, in at least one example, the core network 116 can be responsible for routing voice communication to other networks, as well as routing data communication to external packet switched networks, such as the Internet. In at least one example, the scheduler 112 can be associated with the core network 116 instead of, or in addition to, the base station subsystem 110.

Figure 2:
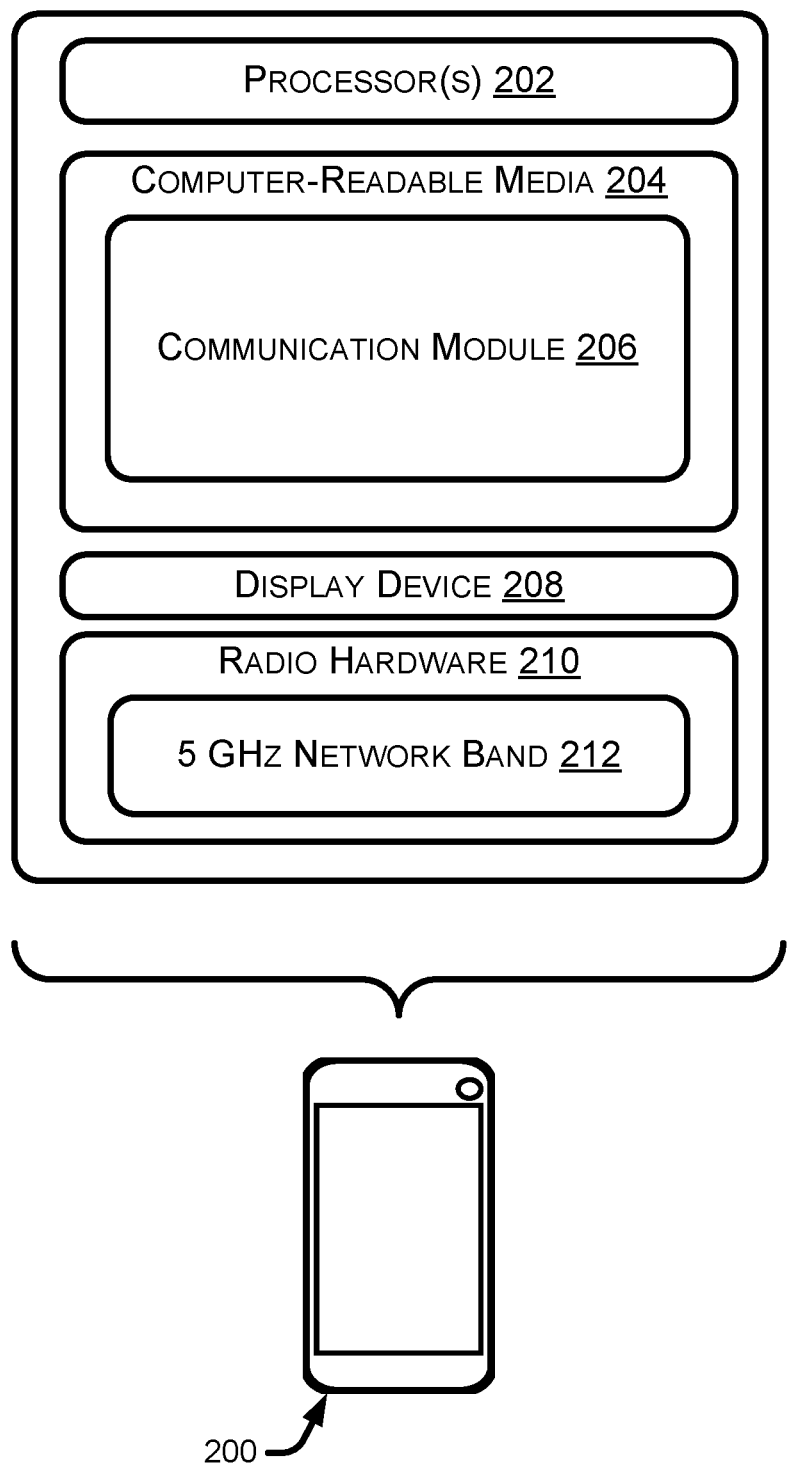
FIG. 2 illustrates an example mobile device configured to communicate via an unlicensed spectrum.

FIG. 2 illustrates an example mobile device 200 configured to communicate via an unlicensed spectrum. In at least one example, mobile device 200 can correspond to user equipment (UE). The UE may include, but is not limited to, one or more of a smart phone, a personal digital assistant, a netbook, a laptop computer, a smart appliance, and/or another electronic device that is capable of sending or receiving voice, video, and/or data via the one or more networks (e.g., a cellular network, the Internet, and/or one or more other network(s)). Mobile device 200 can correspond to either device 102A or device 102B described above with reference to FIG. 1.

As illustrated in FIG. 2, the mobile device 200 can include processor(s) 202 and computer-readable media 204. Processor(s) 202 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 202 can execute one or more modules and/or processes to cause the mobile device 200 to perform a variety of functions, as set forth above and explained in further detail in the following disclosure. Additionally, each of the processor(s) 202 can possess its own local memory, which also can store program modules, program data, and/or one or more operating systems.

Depending on the exact configuration and type of the mobile device 200, the computer-readable media 204, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 204 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the mobile device 200. Any such non-transitory computer-readable media can be part of the mobile device 200.

In contrast, communication media includes computer readable instructions, data structures, program modules, or other data in a modulated data signal, such as a carrier wave, or other transmission mechanism. As defined herein, computer storage media does not include communication media.

The computer-readable media 204 can include one or more modules and data structures including, for example, a communication module 206. The one or more modules and data structures can be in the form of stand-alone applications, productivity applications, an operating system component, or any other application or software module having data items that facilitate interactions between the devices (e.g., device 102A, device 102B, etc.), a core network (e.g., core network 116), and/or one or more networks (e.g., cellular network, Internet, other network(s), etc.), as described herein.

The communication module 206 can facilitate communications between the mobile device 200 and other devices via one or more networks (e.g., cellular network, Internet, other network(s), etc.), as described herein. For instance, the communication module 206 can facilitate sending calls, messages, etc. to other devices via one or more networks (e.g., cellular network, Internet, other network(s), etc.) and/or receiving calls, messages, etc. from other devices via one or more networks (e.g., cellular network, Internet, other network(s), etc.). In at least one example, the communication module 206 can send a request, via a corresponding base station (e.g., base station 106A) to the base station subsystem (e.g., base station subsystem 110), to send data to a second device (e.g., device 102B). The communication module 206 can receive instructions from a corresponding base station subsystem, described above with reference to FIG. 1, indicating when the communication module 206 can begin to send the data. In some examples, the instructions can indicate an amount of data that can be sent, how long the data can be sent, etc. The communication module 206 can send data to the base station subsystem for transmission to one or more other devices (e.g., device 102B). In some examples, the communication module 206 can packetize (e.g., partition) data into data packets and can send one or more data packets over the one or more networks. In other examples, the communication module 206 can send the data as a stream of data. The communication module 206 can also receive data sent by other devices (e.g., device 102B) over the one or more networks. In some examples, the communication module 206 can reassemble data packets received over the one or more networks to recreate the pre-packetized data.

Display device 208 is a non-limiting example of an output interface for communicating information to users. In at least one example, the display device 208 is configured to present graphical user interfaces for conveying information to end users.

Radio hardware 210 provides wireless UE capabilities, such as connecting to a cellular network base station, a Wi-Fi network, or other wireless networks. The radio hardware 210 may include or be incorporated into processors, application-specific integrated circuits (ASICs), programmable circuits such as field programmable gate arrays (FPGAs), or in other ways. The software modules stored on the computer-readable media 204 are configured to access hardware via interrupts, calling APIs, and the like. The software modules may also be configured to pass information to one another, such as through APIs, by storing commands, parameters, etc. in a predetermined memory location, etc. Other examples are possible without departing from the scope of this disclosure. In at least one example, the radio hardware 210 may include technology, such as a 5 GHz network band 212, for enabling the mobile device 200 to communicate via an unlicensed spectrum, such as LTE-U which utilizes an unlicensed 5 GHz spectrum band.

Figure 3:
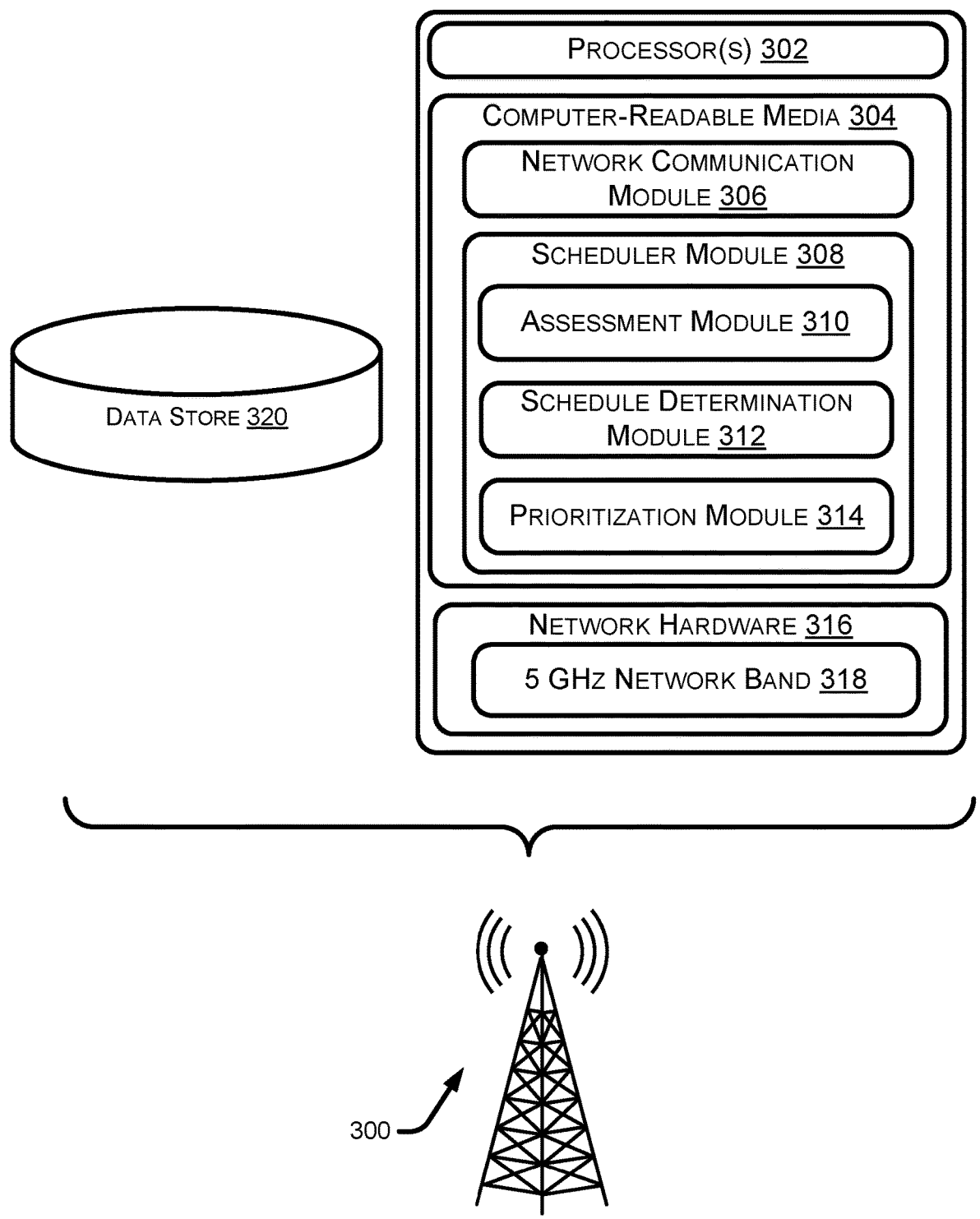
FIG. 3 illustrates an example base station subsystem configured to facilitate network scheduling in unlicensed spectrums.

FIG. 3 illustrates an example base station subsystem 300 configured to facilitate network scheduling in unlicensed spectrums. Base station subsystem 300 can correspond to the base station subsystem 110 described above with reference to FIG. 1. In an alternative example, one or more of the components and corresponding functionality described below can be associated with a core network (e.g., core network 116), as described above with reference to FIG. 1, in addition to, or instead of, the base station subsystem 110.

As illustrated in FIG. 3, the base station subsystem 300 can include processor(s) 302 and computer-readable media 304. Processor(s) 302 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 302 can execute one or more modules and/or processes to cause the servers 300 to perform a variety of functions, as set forth above and explained in further detail in the following disclosure. Additionally, each of the processor(s) 302 can possess its own local memory, which also can store program modules, program data, and/or one or more operating systems.

Depending on the exact configuration and type of the servers 300, the computer-readable media 304, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 304 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the presence server. Any such non-transitory computer-readable media can be part of the presence server.

In contrast, communication media includes computer readable instructions, data structures, program modules, or other data in a modulated data signal, such as a carrier wave, or other transmission mechanism. As defined herein, computer storage media does not include communication media.

The computer-readable media 304 can include one or more modules and data structures including, for example, a network communication module 306 and a scheduler module 308. The scheduler module 308 can correspond to the scheduler 112 described above with reference to FIG. 1. In at least one example, the scheduler module 308 can include an assessment module 310, a schedule determination module 312, and a prioritization module 314. The one or more modules and data structures can be in the form of stand-alone applications, productivity applications, an operating system component, or any other application or software module having data items that facilitate interactions between the base station subsystem 300, devices (e.g., device 102A, device 102B, etc.), a core network (e.g., core network 116), and/or one or more networks (e.g., cellular network, Internet, and/or other network(s)), as described herein.

The network communication module 306 can facilitate sending and receiving communications (e.g., voice, data, etc.) between devices (e.g., device 102A, device 102B, etc.), a core network (e.g., core network 116), and/or other base stations (e.g., base station 106B) that are communicatively coupled to the one or more networks (e.g., cellular network, Internet, and/or other network(s)). In at least one example, a first device (e.g., device 102A) can request to send data to a second device (e.g., device 102B). The network communication module 306 can access a schedule, described above, to determine when the first device can send the data to the network communication module 306, via a corresponding base station (e.g., base station 106A). At a subsequent time, the network communication module 306 can access the schedule to determine when the network communication module 306 can send the data to the second device (e.g., device 102B), via a corresponding base station (e.g., base station 106B).

The scheduler module 308 can assess conditions of the unlicensed spectrum and generate a schedule for exchanging data between two or more devices communicatively coupled to the one or more networks. The network communication module 306 can facilitate data exchange between two or more devices communicatively coupled to the one or more networks based on the schedule, as described above. That is, the network communication module 306 can leverage the schedule to determine when a device (e.g., device 102A) can send data uplink, that is, from the device (e.g., device 102A) to a base station (e.g., base station 106A), which is associated with the base station subsystem 300, and when the base station (e.g., base station 106B) can send data downlink, that is, from the base station to the device (e.g., device 102A) or another base station for transmission to another device (e.g., device 102B). In at least one example, the scheduler module 308 can enable carrier aggregation for LTE, LTE-U, and/or LAA.

The assessment module 310 can be configured to assess the conditions of an unlicensed spectrum. The assessment module 310 can assess the conditions of the unlicensed spectrum at various intervals and without knowledge of upcoming data transmission events. That is, unlike listen before talk (LBT) techniques associated with LAA, described above, which assesses the conditions of the unlicensed spectrum based on an awareness of an upcoming data transmission event, the assessment module 310 assesses the conditions of the unlicensed spectrum randomly, or at configurable intervals, without knowledge of upcoming data transmission events. The assessment module 310 can assess energy levels in the unlicensed spectrum. The energy levels can be generated by other devices exchanging data via the unlicensed spectrum. In some examples, the energy levels can represent a measure of interference.

As described above with reference to FIG. 1, each device that is communicatively coupled to a network of the one or more networks (e.g., network(s) 104) can correspond to a node of the network. In at least one example, each node (e.g., each base station) can assess the conditions of the unlicensed spectrum at an interval of time that is specific to that node. That is, each node can be associated with an interval of time configured for the node after which the assessment module 310 reassesses the conditions of the unlicensed spectrum. For instance, a node located in a remote rainforest can be configured to assess the conditions of the unlicensed spectrum less frequently than a node located in the middle of Seattle, Wash. As a non-limiting example, the node located in the remote rainforest can assess the conditions of the unlicensed spectrum every 30 milliseconds, whereas the node located in the middle of Seattle, Wash. can assess the conditions of the unlicensed spectrum every 1 millisecond.

The schedule determination module 312 can access data output from the assessment module 310 and can determine a schedule for actively managing data transmission over the unlicensed spectrum. In an example, the schedule can indicate a start time for transmitting data via the unlicensed spectrum. The start time can correspond to a time in the future when the interference level is predicted to be below a threshold such that data can be sent or received via the unlicensed spectrum. Additionally, the schedule can indicate a maximum size of data that is permitted to be transmitted via the unlicensed spectrum. That is, the schedule can indicate how much data can be transmitted via the unlicensed spectrum at a particular time. Further, the schedule can indicate a maximum period of time that data is permitted to be transmitted via the unlicensed spectrum. That is, the schedule can indicate how long data can be transmitted via the unlicensed spectrum after the start time. Moreover, in at least one example, the schedule can indicate a regularity at which data is permitted to be transmitted via the unlicensed spectrum. The regularity can indicate a number of data transmission occurrences (i.e., discrete instances of data transmission) that can occur per the period of time. That is, the regularity can indicate, for a period of time and starting at the start time, the number of data transmission occurrences that can occur during the period of time.

The schedule determination module 312 can determine the schedule by estimating, based on the conditions determined by a most recent assessment, an amount of data that can be transmitted, when the data can be transmitted, how long the data can be transmitted, and the regularity at which the data can be transmitted. A schedule can be in effect until the schedule determination module 312 receives updated data that is output from the assessment module 310. Upon receiving updated data from the assessment module 310, the schedule determination module 312 can update a schedule to reflect changes to conditions of the unlicensed spectrum. That is, the schedule determination module 312 can update the schedule to transmit more or less data, transmit data for longer or shorter periods of time, transmit data at a different regularity, etc.

The prioritization module 314 can prioritize multiple data transmission requests. In at least one example, two (or more) devices can request to send data to a base station. In at least one example, there is not enough throughput on the unlicensed spectrum to allow both devices to send data at the same time. Accordingly, the prioritization module 314 can determine an order of priority indicating which device can send data to the base station first, which device can send data to the base station second, and so on. In at least one example, the prioritization module 314 can prioritize requests based on timestamps associated with the requests. In additional and/or alternative examples, the prioritization module 314 can prioritize requests based on IP addresses. In some examples, the prioritization module 314 can prioritize requests based on types of data associated with the requests. In other examples, the prioritization module 314 can prioritize requests based on balancing incoming requests such to maximize the throughput associated with the one or more network(s). Additional and/or other techniques can be used to prioritize multiple requests.

The base station subsystem 300 can further include network hardware 316. Network hardware 316 provides wired or wireless networking capabilities to the base station subsystem 300. The network hardware 316 may include or be incorporated into processors, application-specific integrated circuits (ASICs), programmable circuits such as field programmable gate arrays (FPGAs), or in other ways. The software modules stored on the computer-readable media 304 are configured to access hardware via interrupts, calling APIs, and the like. The software modules may also be configured to pass information to one another, such as through APIs, storing commands, parameters, etc. in a predetermined memory location, etc. Other examples are possible without departing from the scope of this disclosure. In at least one example, the network hardware 316 can include technology, such as a 5 GHz network band 318, for enabling the base station subsystem to communicate via an unlicensed spectrum, such as LTE-U which utilizes an unlicensed 5 GHz spectrum band.

In at least one example, the base station subsystem 300 can be associated with a data store 320. In some examples, the data store 320 is communicatively coupled to the base station subsystem 300. In other examples, the data store 320 is integral to the base station subsystem 300. The data store 320 can temporarily store a data received from a first device (e.g., device 102A) prior to sending the data to a second device (e.g., device 102B). That is, the data store 320 can store data received from a first device (e.g., device 102A) until the network communication module 306 accesses the data to send the data to the second device (e.g., device 102B).

Figure 4:
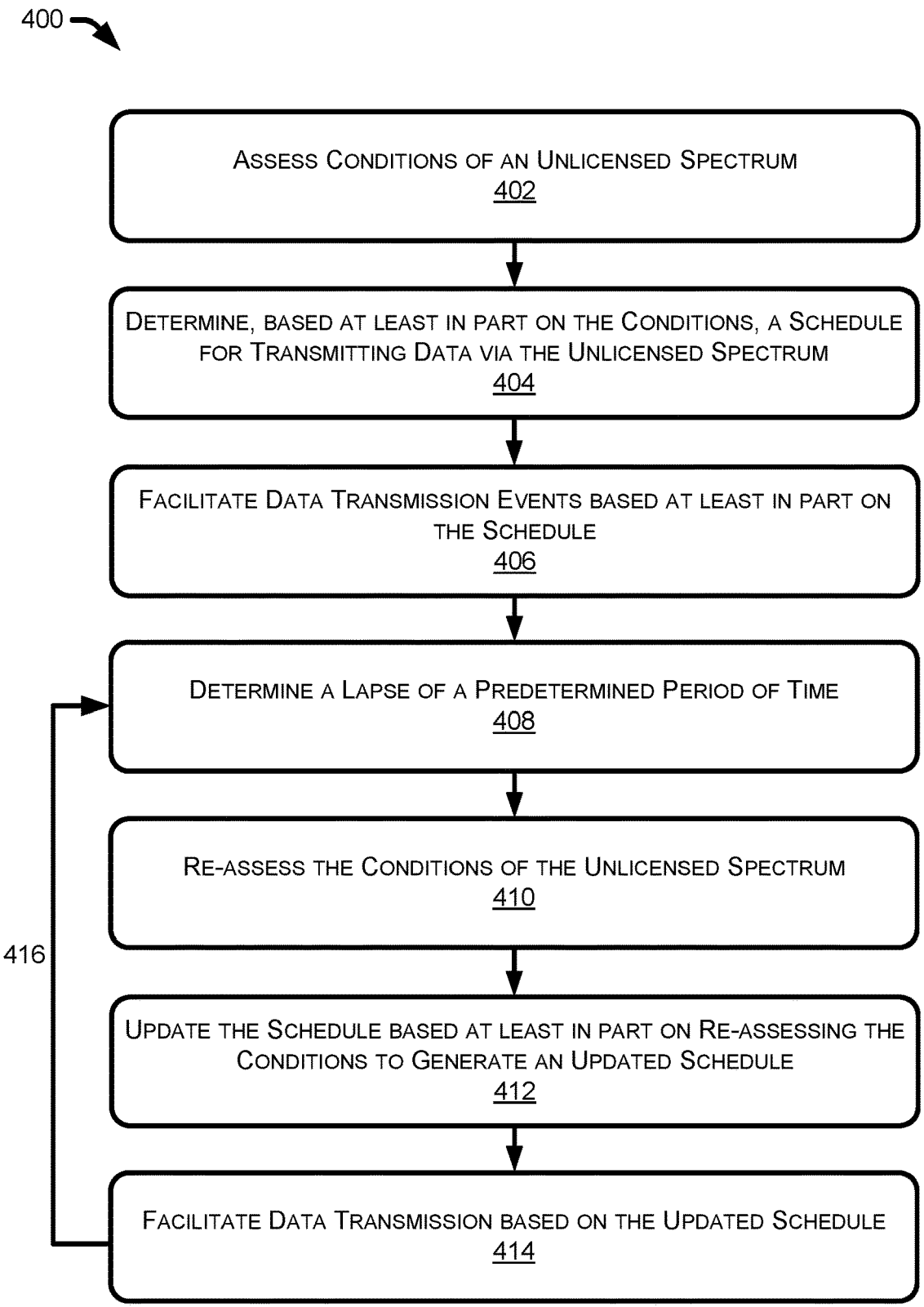
FIG. 4 illustrates an example process for facilitating network scheduling in unlicensed spectrums.
Figure 5:
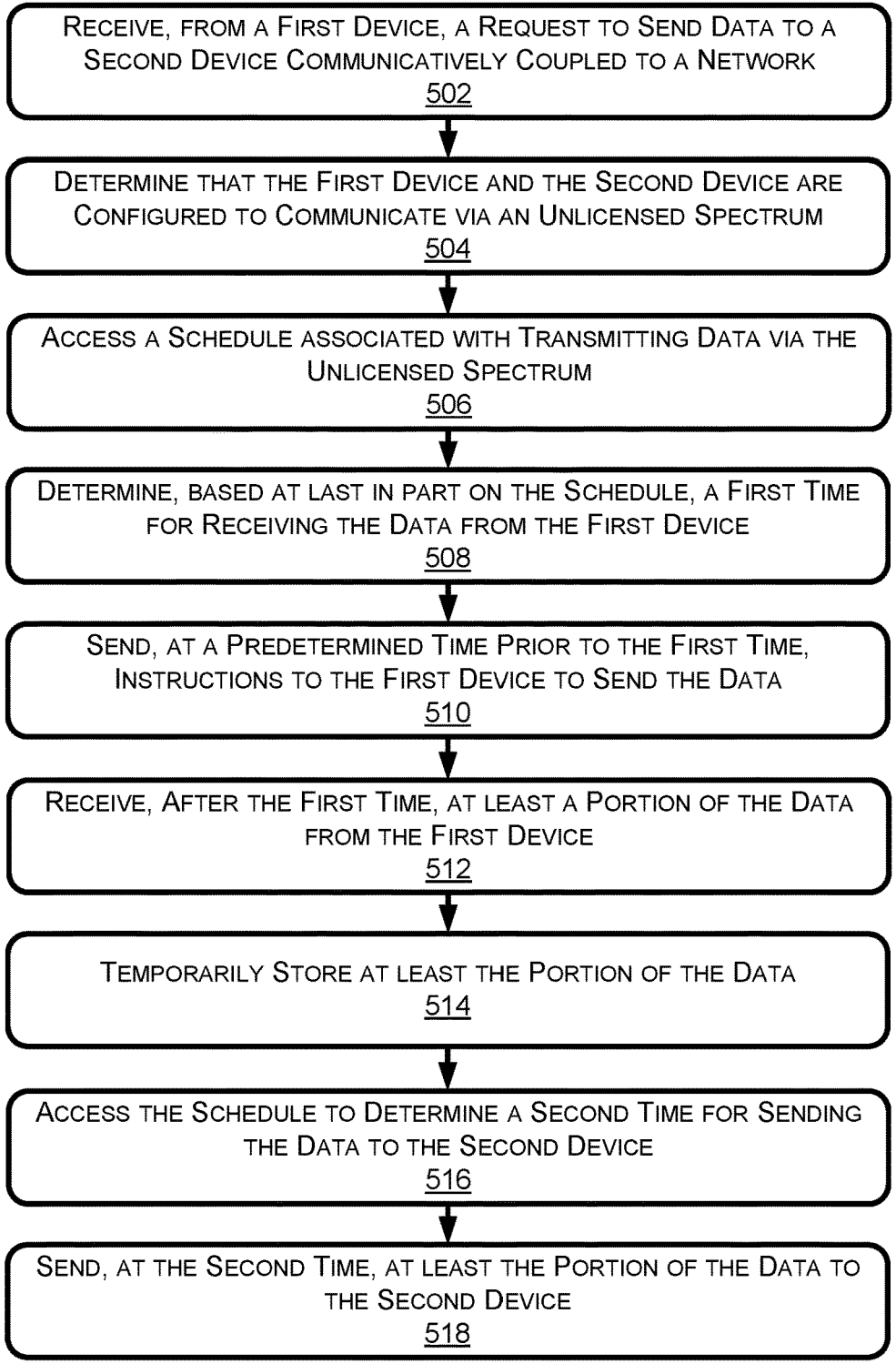
FIG. 5 illustrates another example process for facilitating network scheduling in unlicensed spectrums.

FIGS. 4 and 5 describe example processes for facilitating network scheduling in unlicensed spectrums, such as LTE-U. The example processes are described in the context of the environments of FIGS. 1-3, but are not limited to those environments.

FIG. 4 illustrates an example process 400 for facilitating network scheduling in unlicensed spectrums.

Block 402 illustrates assessing conditions of an unlicensed spectrum. As described above, the assessment module 310 can be configured to assess the conditions of an unlicensed spectrum. The assessment module 310 can assess the conditions of the unlicensed spectrum at various intervals and without knowledge of upcoming data transmission events. As described above, the assessment module 310 can assess energy levels in the unlicensed spectrum. The energy levels can be generated by other devices exchanging data via the unlicensed spectrum. In some examples, the energy levels can represent a measure of interference.

Block 404 illustrates determining, based at least in part on the conditions, a schedule for transmitting data via the unlicensed spectrum. As described above, the schedule determination module 312 can access data output from the assessment module 310 and can determine a schedule for actively managing data transmission over the unlicensed spectrum. In an example, the schedule can indicate a start time for transmitting data via the unlicensed spectrum, a maximum size of data that is permitted to be transmitted via the unlicensed spectrum, a maximum period of time that data is permitted to be transmitted via the unlicensed spectrum, and/or a regularity at which data is permitted to be transmitted via the unlicensed spectrum.

Block 406 illustrates facilitating data transmission events based at least in part on the schedule. The network communication module 306 can facilitate data exchange between two or more devices communicatively coupled to the one or more networks based on the schedule, as described above. That is, the network communication module 306 can leverage the schedule to determine when a device (e.g., device 102A) can send data uplink, that is, from the device (e.g., device 102A) to a base station (e.g., base station 106A), which is associated with the base station subsystem 300, and when the base station (e.g., base station 106B) can send data downlink, that is, from the base station to the device (e.g., device 102A) or another base station for transmission to another device (e.g., device 102B).

Block 408 illustrates determining a lapse of a predetermined period of time. As described above, the assessment module 310 can assess the conditions of the unlicensed spectrum at various intervals, without knowledge of upcoming data transmission events. In at least one example, the intervals are configurable. That is, a programmer or other individual can determine a period of time after which the assessment module 310 is to re-assess the conditions of the unlicensed spectrum. The assessment module 310 can determine a lapse of the applicable predetermined period of time.

Block 410 illustrates re-assessing the conditions of the unlicensed spectrum. The assessment module 310 can determine a lapse of the applicable predetermined period of time and can re-assess the conditions of the unlicensed spectrum. As described above, the assessment module 310 can assess energy levels in the unlicensed spectrum. The energy levels can be generated by other devices exchanging data via the unlicensed spectrum. In some examples, the energy levels can represent a measure of interference.

Block 412 illustrates updating the schedule based at least in part on re-assessing the conditions to generate an updated schedule. As described above, the schedule determination module 312 can access data output from the assessment module 310 and can determine a schedule for actively managing data transmission over the unlicensed spectrum. Upon receiving updated data from the assessment module 310, the schedule determination module 312 can update a schedule to reflect changes to conditions of the unlicensed spectrum. That is, the schedule determination module 312 can update the schedule to transmit more or less data, transmit data for longer or shorter periods of time, transmit data at a different regularity, etc.

Block 414 illustrates facilitating data transmission events based on the updated schedule. The network communication module 306 can facilitate data exchange between two or more devices communicatively coupled to the one or more networks based on the updated schedule. As described above, the network communication module 306 can leverage the updated schedule to determine when a device (e.g., device 102A) can send data uplink, that is, from the device (e.g., device 102A) to a base station (e.g., base station 106A), which is associated with the base station subsystem 300, and when the base station (e.g., base station 106B) can send data downlink, that is, from the base station to the device (e.g., device 102A) or another base station for transmission to another device (e.g., device 102B).

The scheduler module 306 can repeat the process starting at block 408, as shown by line 416. That is, the assessment module 310 can determine a lapse of a predetermined period of time, re-assess the conditions of the unlicensed spectrum, update the schedule, and facilitate data transmission based on the updated schedule.

FIG. 5 illustrates another example process 500 for facilitating network scheduling in unlicensed spectrums.

Block 502 illustrates receiving, from a first device, a request to send data to a second device communicatively coupled to a network. In at least one example, a first device (e.g., device 102A) can request to send data to a second device (e.g., device 102B). The network communication module 306 can receive the request from the first device (e.g., device 102A).

Block 504 illustrates determining that the first device and the second device are configured to communicate via an unlicensed spectrum. In at least one example, the network communication module 306 can determine that the first device (e.g., device 102A) and the second device (e.g., device 102B) are configured to communicate via an unlicensed spectrum based at least in part on determining that the first device (e.g., device 102A) and the second device (e.g., device 102B) are equipped with 5 GHz network bands (e.g., 5 GHz network band 212).

Block 506 illustrates accessing a schedule associated with transmitting data via the unlicensed spectrum. The network communication module 306 can access a schedule determined by the scheduler module 308, as described above.

Block 508 illustrates determining, based at least in part on the schedule, a first time for receiving the data from the first device. The network communication module 306 can access the schedule, described above, to determine when the first device (e.g., device 102A) can send the data to the network communication module 306, via a corresponding base station (e.g., base station 106A).

Block 510 illustrates sending, at a predetermined time prior to the first time, instructions to the first device to send the data. The network communication module 306 can send instructions to the first device (e.g., device 102A) indicating when the first device (e.g., device 102A) can start sending data to the network communication module 306. The network communication module 306 can send the instructions at a predetermined time prior to the time that the first device (e.g., device 102A) is permitted to send data.

Block 512 illustrates receiving, after the first time, at least a portion of the data from the first device. The network communication module 306 can receive at least a portion of the data after the first time. That is, the first device (e.g., device 102A) can begin sending at least a portion of data at the first time (i.e., the time that the first device (e.g., device 102A) is permitted to start sending data) and the network communication module 306 can receive at least a portion of the data at some time after the first device (e.g., device 102A) starts sending the data. In some examples, the first device (e.g., device 102A) can packetize (e.g., partition) data into data packets and can send one or more data packets over the one or more networks 104. In other examples, the first device (e.g., device 102A) can send the data as a stream of data.

Block 514 illustrates temporarily storing at least the portion of the data. The network communication module 306 can temporarily store at least the portion of the data in the data store 320. The data store 320 can store data received from the first device (e.g., device 102A) until the network communication module 306 accesses the data to send the data to the second device (e.g., device 102B).

Block 516 illustrates accessing the schedule to determine a second time for sending the data to the second device. At a subsequent time, the network communication module 306 can access the schedule to determine when the network communication module 306 can send the data to the second device (e.g., device 102B), via a corresponding base station (e.g., base station 106B).

Block 518 illustrates sending, at the second time, at least the portion of the data to the second device. Based at least in part on the network communication module 306 accessing the schedule, the network communication module 306 can send the data to the second device (e.g., device 102B), via a corresponding base station (e.g., base station 106B).

As described above, in at least one example, the network communication module 306 can receive two (or more)

requests to send data via the unlicensed spectrum. The prioritization module 314 can prioritize multiple data transmission requests. That is, the prioritization module 314 can determine an order of priority indicating which device can send data to the base station first, which device can send data to the base station second, and so on. In at least one example, the prioritization module 314 can prioritize requests based on timestamps associated with the requests. In additional and/or alternative examples, the prioritization module 314 can prioritize requests based on IP addresses. In some examples, the prioritization module 314 can prioritize requests based on types of data associated with the requests. In other examples, the prioritization module 314 can prioritize requests based on balancing incoming requests such as to maximize the throughput associated with the one or more network(s). Additional and/or other techniques can be used to prioritize multiple requests.

The processes described above in association with FIGS. 4 and 5 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system associated with a cellular base station, the system comprising:
    one or more processors;
    memory; and
    a plurality of programming instructions stored on the memory and executable by the one or more processors to perform operations comprising:
        assessing, at a first time, first interference in an unlicensed spectrum by measuring energy levels in the unlicensed spectrum;
        determining, based at least in part on the first interference, a first schedule to determine a start time for transmitting data via the unlicensed spectrum, a maximum amount of data that is permitted to be transmitted via the unlicensed spectrum, and a maximum amount of time that data is permitted to be transmitted via the unlicensed spectrum;
        facilitating, for a first period of time between the first time and a second time after the first time, first data transmission events between two or more mobile devices based at least in part on the first schedule, each of the two or more mobile devices including technology for exchanging data via the unlicensed spectrum;
        assessing, at the second time, second interference in the unlicensed spectrum; and
        determining, based at least in part on the second interference, a second schedule to be used for facilitating second transmission events during a second period of time between the second time and a third time after the second time, wherein the first period of time and the second period of time comprise a same amount of time.

2. The system of claim 1, wherein the maximum amount of time is configurable.

3. The system of claim 1, the operations further comprising assessing the first interference without knowledge of upcoming data transmission events.

4. The system of claim 1, the operations further comprising facilitating carrier aggregation between the unlicensed spectrum and at least a 4G wireless communications standard.

5. The system of claim 1, wherein facilitating first data transmission events between the two or more mobile devices comprises:
    receiving, from a first mobile device of the two or more mobile devices, a request to send a data item to a second mobile device of the two or more mobile devices;
    determining that a size of the data item is less than the maximum amount of data that is permitted to be transmitted via the unlicensed spectrum;
    restricting the first mobile device from sending the data item until the start time; and
    after the start time, receiving at least a portion of the data item from the first mobile device.

6. The system of claim 5, wherein the first schedule further identifies a regularity at which additional data is permitted to be transmitted via the unlicensed spectrum.

7. The system of claim 6, wherein facilitating first data transmission events between the two or more mobile devices comprises:
    temporarily storing at least the portion of the data item;
    determining, based at least in part on the regularity, a subsequent start time; and
    at the subsequent start time, sending at least a portion of the data item to the second mobile device.

8. A method comprising:
    assessing, at a first time and by a scheduler associated with a communication tower, first conditions of a Long-Term Evolution unlicensed (LTE-U) spectrum by measuring energy levels in the LTE-U spectrum;
    determining, based at least in part on the first conditions, a schedule for transmitting data via the LTE-U spectrum;
    transmitting, for a first period of time and based at least in part on the schedule, data between two or more mobile devices of a plurality of mobile devices that are communicatively coupled to the communication tower, each of the plurality of mobile devices being associated with an order of priority based at least in part on a timestamp associated with a request to send data;
    assessing, at a second time after the first time, second conditions of the LTE-U spectrum;
    updating the schedule based at least in part on the second conditions of the LTE-U spectrum to generate an updated schedule; and transmitting, for a second period of time, data between the plurality of mobile devices based at least in part on the updated schedule,
wherein the schedule indicates at least a maximum size of data that is permitted to be transmitted via the LTE-U spectrum.

9. The method of claim 8, wherein the communication tower is a node in a communications network comprising a plurality of nodes and the communications network is configured to transmit data via the LTE-U spectrum.

10. The method of claim 8, wherein at least one of the first conditions or the second conditions include a measure of interference caused by presence of other devices communicating via the LTE-U spectrum.

11. The method of claim 8, wherein the schedule indicates at least a start time for transmitting data via the LTE-U spectrum.

12. The method of claim 8, wherein the schedule indicates at least a maximum period of time that data is permitted to be transmitted via the LTE-U spectrum.

13. The method of claim 11, wherein the schedule indicates at least a regularity at which data is permitted to be transmitted via the LTE-U spectrum.

14. A non-transitory computer-readable storage medium having programming instructions stored thereon which, when executed by a computing device, cause the computing device to perform operations comprising:
assessing, at a first time, first interference in an unlicensed spectrum;
determining, based at least in part on the first interference, a first schedule to determine a start time for transmitting data via the unlicensed spectrum, a maximum amount of data that is permitted to be transmitted via the unlicensed spectrum, and a maximum amount of time that data is permitted to be transmitted via the unlicensed spectrum;
facilitating, for a first period of time between the first time and a second time after the first time, first data transmission events between two or more mobile devices based at least in part on the first schedule and an order of priority associated with at least one of the two or more mobile devices, the order of priority being based at least in part on a type of data associated with the first data transmission event;
assessing, at the second time, second interference in the unlicensed spectrum; and
determining, based at least in part on the second interference, a second schedule to be used for facilitating second transmission events during a second period of time between the second time and a third time after the second time.

15. The non-transitory computer-readable storage medium of claim 14, wherein the operations further comprise assessing the first interference without knowledge of upcoming data transmission events.

16. The non-transitory computer-readable storage medium of claim 14, wherein the operations further comprise facilitating carrier aggregation between the unlicensed spectrum and at least a 4G wireless communications standard.

17. The non-transitory computer-readable storage medium of claim 14, wherein facilitating first data transmission events between the two or more mobile devices comprises:
receiving, from a first mobile device of the two or more mobile devices, a request to send a data item to a second mobile device of the two or more mobile devices;
determining that a size of the data item is less than the maximum amount of data that is permitted to be transmitted via the unlicensed spectrum;
restricting the first mobile device from sending the data item until the start time; and
after the start time, receiving at least a portion of the data item from the first mobile device.

18. The non-transitory computer-readable storage medium of claim 17, wherein the first schedule further identifies a regularity at which additional data is permitted to be transmitted via the unlicensed spectrum.

19. The non-transitory computer-readable storage medium of claim 18, wherein facilitating first data transmission events between the two or more mobile devices comprises:
temporarily storing at least the portion of the data item;
determining, based at least in part on the regularity, a subsequent start time; and
at the subsequent start time, sending at least a portion of the data item to the second mobile device.

20. The system of claim 1, wherein facilitating first data transmission events between the two or more mobile devices is based at least in part on an order of priority associated with at least one of the two or more mobile devices, the order of priority being based at least in part on IP addresses associated with the two or more mobile devices or maximizing a throughput associated with the unlicensed spectrum.

* * * * *